(12) United States Patent
Moilanen

(10) Patent No.: US 10,359,149 B2
(45) Date of Patent: Jul. 23, 2019

(54) SYSTEM, METHOD AND COMPUTER PROGRAM PRODUCT

(71) Applicant: Teuvo Risto Moilanen, Saynatsalo (FI)

(72) Inventor: Teuvo Risto Moilanen, Saynatsalo (FI)

(73) Assignee: Osakeyhtiö SKF Aktiebolag, Espoo (FI)

(*) Notice: Subject to any disclaimer, the term of this patent is extended or adjusted under 35 U.S.C. 154(b) by 182 days.

(21) Appl. No.: 14/995,254

(22) Filed: Jan. 14, 2016

(65) Prior Publication Data

US 2016/0208983 A1 Jul. 21, 2016

(30) Foreign Application Priority Data

Jan. 21, 2015 (SE) ...................................... 1550049

(51) Int. Cl.
| | |
|---|---|
| *F16N 29/02* | (2006.01) |
| *F16N 13/00* | (2006.01) |
| *F16N 19/00* | (2006.01) |
| *F16N 21/00* | (2006.01) |
| *F16N 13/06* | (2006.01) |
| *F16N 29/00* | (2006.01) |

(52) U.S. Cl.
CPC .............. *F16N 29/02* (2013.01); *F16N 13/00* (2013.01); *F16N 13/06* (2013.01); *F16N 19/00* (2013.01); *F16N 21/00* (2013.01); *F16N 29/00* (2013.01); *F16N 2013/063* (2013.01); *F16N 2250/40* (2013.01)

(58) Field of Classification Search
CPC .......... F16N 29/02; F16N 29/00; F16N 13/00; F16N 13/06; F16N 19/00; F16N 21/00; F16N 2013/063; F16N 2250/40; H02P 7/00

See application file for complete search history.

(56) References Cited

U.S. PATENT DOCUMENTS

| | | | | |
|---|---|---|---|---|
| 4,124,146 A | * | 11/1978 | Sealfon ................... | G01F 13/00 222/641 |
| 4,277,832 A | * | 7/1981 | Wong ................... | G05D 7/0635 137/487 |
| 4,797,834 A | * | 1/1989 | Honganen ........... | F04B 11/0058 137/2 |

(Continued)

FOREIGN PATENT DOCUMENTS

EP 1001167 A2 5/2000

*Primary Examiner* — Michael A Riegelman
(74) *Attorney, Agent, or Firm* — Bryan Peckjian; SKF USA Inc. Patent Dept.

(57) ABSTRACT

A lubrication system comprising a motor, a positive displacement pump driven by the motor, a lubricant container in fluid communication with the positive displacement pump and at least one lubricant outlet in fluid communication with the lubricant container. The positive displacement pump is arranged to carry out at least one discharge stroke to dispense lubricant from the at least one lubricant outlet when the lubrication system is in use. The lubrication system also comprises a control unit that is arranged to determine an amount of lubricant that is dispensed from the lubricant container via the at least one lubricant outlet when the lubrication system is in use. The control unit is arranged to monitor current supplied to the motor to obtain a motor current signal, and to determine a number of the discharge strokes from the motor current signal.

9 Claims, 3 Drawing Sheets

(56) References Cited

U.S. PATENT DOCUMENTS

| | | | |
|---|---|---|---|
| 4,994,984 A | 2/1991 | Massimo | |
| 5,080,195 A * | 1/1992 | Mizumoto | F16C 33/6622 184/104.1 |
| 5,086,877 A * | 2/1992 | Synatschke | F16N 27/00 137/501 |
| 5,583,790 A * | 12/1996 | Lan | B67D 7/303 700/282 |
| 6,174,136 B1 * | 1/2001 | Kilayko | F04B 17/046 417/44.1 |
| 6,264,432 B1 * | 7/2001 | Kilayko | F04B 17/04 417/44.1 |
| 6,273,689 B1 * | 8/2001 | Kenichi | F04B 17/046 417/417 |
| 6,280,147 B1 * | 8/2001 | Kilayko | F04B 17/046 417/15 |
| 6,457,944 B1 * | 10/2002 | Haberlander | F04B 49/06 417/44.1 |
| 8,528,782 B2 | 9/2013 | Mergener et al. | |
| 8,899,450 B2 * | 12/2014 | Johansson | F04B 17/044 222/1 |
| 9,813,000 B2 * | 11/2017 | Jabusch | F04D 25/06 |
| 2003/0116509 A1 * | 6/2003 | Manz | F16N 29/00 210/745 |
| 2007/0095395 A1 * | 5/2007 | Spiess | F16N 29/02 137/246 |
| 2008/0001560 A1 * | 1/2008 | Livoti | F04B 17/04 318/129 |
| 2008/0202854 A1 | 8/2008 | Paluncic et al. | |
| 2010/0321030 A1 * | 12/2010 | Gale | F04B 51/00 324/537 |
| 2012/0132305 A1 * | 5/2012 | Conley | F16N 7/14 137/565.17 |
| 2012/0247876 A1 * | 10/2012 | Kreutzkamper | F16N 7/385 184/26 |
| 2013/0168188 A1 | 7/2013 | Donovan | |
| 2013/0169093 A1 * | 7/2013 | Begg | H02K 7/08 310/90 |
| 2014/0238742 A1 * | 8/2014 | Borek | F16N 29/02 175/40 |
| 2015/0224618 A1 * | 8/2015 | Wakabayashi | B23Q 17/008 409/136 |
| 2016/0186740 A1 * | 6/2016 | Klaphake | F04B 17/03 417/45 |
| 2017/0045040 A1 * | 2/2017 | Czichowski | F03D 80/70 |

\* cited by examiner

SYSTEM, METHOD AND COMPUTER PROGRAM PRODUCT

CROSS REFERENCE TO RELATED APPLICATION

This is a Non-Provisional Patent Application, filed under the Paris Convention, claiming the benefit of Sweden (SE) Patent Application Number 1550049-9, filed on 21 Jan. 2015 (Jan. 21, 2015), which is incorporated herein by reference in its entirety.

TECHNICAL FIELD

The present invention concerns a lubrication system comprising a control unit that is arranged to determine the amount of lubricant that is dispensed from the lubricant system when it is in use. The present invention also concerns a method and a computer program product for determining the amount of lubricant that is dispensed from such a lubricant system when it is in use.

BACKGROUND OF THE INVENTION

Lubrication systems perform the task of supplying individual lubrication points or a group of lubrication points, such as at least one part of a bearing, joint, gear, and/or any other part(s) of one or more machines with a varying or non-varying amount of exactly metered lubricant to ensure that no lubrication point is over-lubricated or under-lubricated. Over- or under-lubrication can namely negatively influence a machine component's service life and may result in machine breakdown.

In a lubrication system a lubricant is usually fed to one or more lubrication points using a motor-driven feed pump, such as a piston pump, which ensures that lubricant is dispensed in the required amount. A lubrication system is usually monitored and controlled using components such as lubricant level sensors and switches, pressure switches/gauges and transmitters, flow meters, volumetric meters, oil-streak sensors, dirt indicators, differential pressure switches, motion displays, piston detectors, moisture sensors and temperature measuring devices.

U.S. Pat. No. 8,528,782 discloses a grease gun that includes a housing, a motor positioned within the housing, a pump assembly coupled to and driven by the motor, and a chamber supported by the housing in fluid communication with the pump assembly. The chamber is configured to store a liquid. The grease gun also includes an outlet in fluid communication with the chamber and a measurement system operable to measure an amount of liquid being dispensed through the outlet. The measurement system monitors a change in current of the motor over a cycle of the pump assembly, compares the change in current to a predetermined value, and, if the change in current is greater than the predetermined value, increases a pump cycle counter to indicate that liquid was dispensed. If the change is current is less than the predetermined value, it is inferred that there is an air bubble in the pump assembly or that the chamber is empty. A Hall proximity sensor is used for determining when the piston cycle is completed.

SUMMARY OF THE INVENTION

An object of the invention is to provide an improved lubrication system comprising a motor, such as a DC electric motor, a positive displacement pump driven by the motor, a lubricant container in fluid communication with the positive displacement pump and at least one lubricant outlet in fluid communication with the lubricant container. The positive displacement pump is arranged to carry out at least one discharge stroke to dispense lubricant from the at least one lubricant outlet when the lubrication system is in use. The lubrication system also comprises a control unit that is arranged to determine the amount of lubricant that is dispensed from the lubricant container via the at least one lubricant outlet when the lubrication system is in use This object is achieved by a lubrication system comprising a control unit that is arranged to monitor current supplied to the motor so as to obtain a motor current signal, and to determine the number of the discharge strokes from the motor current signal. No additional equipment is therefore necessary to count discharge strokes. The number of discharge strokes can be directly obtained from the motor current signal. If the number of discharge strokes is known, and if the amount of lubricant dispensed from each lubricant outlet with each discharge stroke is known or can be determined, then the volume or weight output of lubricant from the lubrication system can consequently be determined and the lubrication system can thereby be controlled to dispense a desired amount of lubricant when necessary.

Additionally, components such as pressure switches/gauges and transmitters, flow meters, volumetric meters, differential pressure switches and piston detectors are not required to monitor and control the lubrication system, thereby reducing the cost and complexity of the control unit needed for monitoring the lubrication system. Furthermore, it is possible to determine from the current shape minimum/maximum relationship that the output is lubricant and not air.

A lubrication system according to the present invention may be used for any industrial application to provide the appropriate lubrication quantity at the correct intervals, thereby minimizing friction and wear and optimizing component and machinery service life. The lubrication system provides proper, precise lubricant replenishment to all required points, enabling significant savings in repair and spare costs, increased machine reliability, savings in lubricant costs due to accurate timing and dosing of lubricants, fewer shutdowns and production losses, reduced environmental impact and greater safety for workers.

According to an embodiment of the invention the control unit is arranged to convert the motor current signal to pulses and count the number of the discharge strokes by counting the pulses.

According to an embodiment of the invention the control unit is arranged to determine the output pressure of the positive displacement pump from the motor current signal.

The present invention also concerns a method for determining the amount of lubricant that is dispensed from a lubrication system, such as a lubrication system according to any embodiment of the present invention. The lubrication system comprises a motor, a positive displacement pump driven by the motor, a lubricant container in fluid communication with the positive displacement pump and at least one lubricant outlet in fluid communication with the lubricant container. The positive displacement pump is arranged to carry out at least one discharge stroke to dispense lubricant from the at least one lubricant outlet when the lubrication system is in use. The lubrication system also comprises a control unit that is arranged to determine the amount of lubricant that is dispensed from the lubricant container via the at least one lubricant outlet when the lubrication system is in use. The method comprises the steps of monitoring current supplied to the motor so as to obtain a motor current signal, and determining the number of the discharge strokes from the motor current signal.

According to an embodiment of the invention the method comprises the steps of converting the motor current signal to pulses and counting the number of the discharge strokes by counting the pulses.

According to an embodiment of the invention the method comprises the step of determining the output pressure of the positive displacement pump from the motor current signal.

The present invention further concerns a computer program product that comprises a computer program containing computer program code means arranged to cause a computer or a processor to execute the steps of a method according to any of the embodiments of the present invention, stored on a computer-readable medium or a carrier wave.

A lubrication system, a method or a computer program product according to the present invention may be used to lubricate at least a part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, or any component for an application in which it is subjected to alternating Hertzian stresses, such as rolling contact or combined rolling and sliding. At least one part of gear teeth, a camshaft, a fastener, a pin, an automotive clutch plate, a tool, or a die may be lubricated.

The lubrication system, a method or a computer program product may be used in automotive, aerospace, wind, marine, printing, construction, metal producing applications, and/or any machine applications. For example, lubrication system, a method or a computer program product may be used to lubricate any part of a paper machine, continuous caster, fan, blower, crushing and/or grinding mills, an industrial transmission, conveyor, a motor or pump.

BRIEF DESCRIPTION OF THE DRAWINGS

The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION OF EMBODIMENTS

Figure 1:
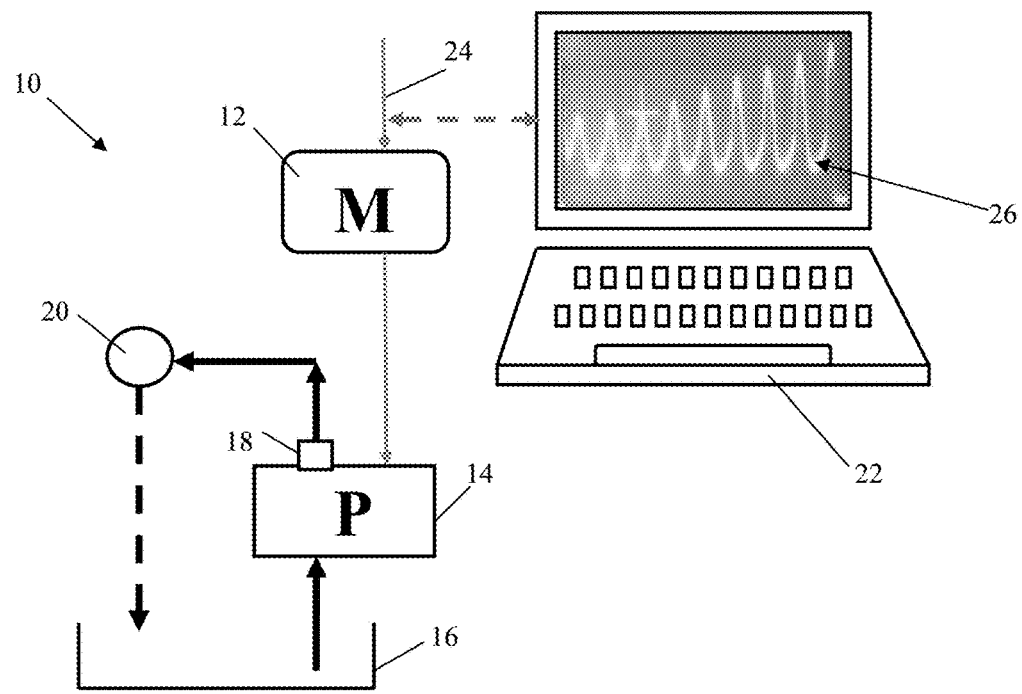
FIG. 1 shows a lubrication system according to an embodiment of the present invention.

FIG. 1 shows a lubrication system 10 comprising a motor 12, a positive displacement pump 14 driven by the motor 12, a lubricant container 16 in fluid communication with the positive displacement pump 14 and a lubricant outlet 18 in fluid communication with the lubricant container 16. The motor 12 is a DC electric motor. The fluid container 16 can be arranged to store lubricant directly or to receive lubricant-filled cartridges.

The positive displacement pump 14 is arranged to carry out at least one discharge stroke to dispense lubricant from the lubricant outlet 16 when the lubrication system 10 is in use. The lubricant dispensed from the lubricant outlet 16 lubricates a lubricant point 20. In circulation lubrication systems, lubricant may then be returned to the lubricant container 16 although this will not be the case in total loss lubrication systems. The lubrication system 10 comprises a control unit 22 that is arranged to determine the amount of lubricant that is dispensed from the lubricant container 16 via the lubricant outlet 16 when the lubrication system 10 is in use. It should be noted that the control unit 22 is typically an embedded controller inside a pump instead of an external computer as illustrated in FIG. 1.

The positive displacement pump 14 may be a piston pump, such as an axial or a radial piston pump. A piston pump usually comprises reciprocating element, such as a piston which is arranged to reciprocate in a chamber in the pump head. The lubricant inlet and -outlet lines are joined to the piston chamber. There are usually two check valves attached to the pump head, one at the inlet line and the other at the outlet line. The inlet valve allows flow from the inlet line to the piston chamber, but not in the reverse direction. The outlet valve allows flow from the chamber to the outlet line, but not in reverse. The motor 12 that drives the piston pump repeatedly moves the piston back and forth in the piston chamber, causing the volume of the chamber to repeatedly become smaller and larger. When the piston moves out, a vacuum is created. Low pressure in the chamber causes lubricant to enter and fill the chamber through the inlet check valve, and higher pressure at the outlet causes the outlet valve to shut. Then when the piston moves into the chamber, it pressurizes the lubricant in the chamber. High pressure in the chamber causes the inlet valve to shut and forces the outlet valve to open, forcing lubricant out at the outlet. These alternating suction and discharge strokes are repeated over and over to meter the lubricant. In back of the chamber, there is a seal around the piston with a toroid-shaped sphincter-like spring inside compressing the seal around the piston. This holds the lubricant pressure when the piston slides in and out of the chamber and makes the pump leak-tight. The metering rate can be adjusted by varying the stroke length by which the piston moves back and forth or varying the speed of the piston motion.

A single-piston pump delivers liquid to a lubricant outlet only during the discharge stroke. If the piston's suction and discharge strokes occur at the same speed and lubricant is metered out half the time the pump is working, then the overall metering rate averaged over time equals half the average flow rate during the discharge stroke. Some single-piston pumps may have a constant slow piston motion for discharge and a quick retract motion for refilling the pump head. In such cases, the overall metering rate is practically equal to the pumping rate during the discharge stroke.

The lubrication system 10 comprises a control unit 22 that is arranged to monitor current 24 supplied to the motor 12, for example by measuring the output of a motor driver, so as to obtain a motor current signal 26, and to determine the number of the discharge strokes from the motor current signal 26. A motor current signal 26 can be displayed on display means, such as a computer monitor or an oscilloscope screen. A display means may also be used to display the amount of lubricant (in volume or weight) dispensed during each discharge stroke of the positive displacement pump or the amount of lubricant that has already been dispensed.

Data and/or one or more control signals may optionally be sent to the motor 12 and/or to a lubrication system controller to provide information about the amount of lubricant that has been dispensed and/or the amount of lubricant that is being dispensed. It can be determined whether the strokes of the positive displacement pump 14 are pumping lubricant or air and then the amount of lubricant can be controlled by counting the strokes.

It should be noted that a lubrication system 10 according to the present invention may comprise additional conventional components such as a lubricant filters or a cooling system. Additionally, a lubrication system 10 according to the present invention may be used to lubricate any number of lubrication points 20 on one or more machines. Furthermore, a control unit 22 need not necessarily be located in the same location as a lubrication system 10. A control unit 22 may namely be arranged at any local or remote location and it be arranged to communicate with one or more lubrication systems 10 according to the present invention by any suitable wired or wireless means. A control unit 22 need not necessarily constitute a single unit, but may comprise a plurality of separate components located at one or more locations.

In the embodiment illustrated in FIG. 1, the control unit 22 is a computer comprising a display means for displaying motor current signals 26 to a user. Lubrication system commands may be inputted via the control unit 22 and data may be displayed and/or be sent to a database and/or another display means and/or another user. A control system 22 may be arranged to issue and/or send an alarm signal on analysis of motor current signals 26.

Figure 2:
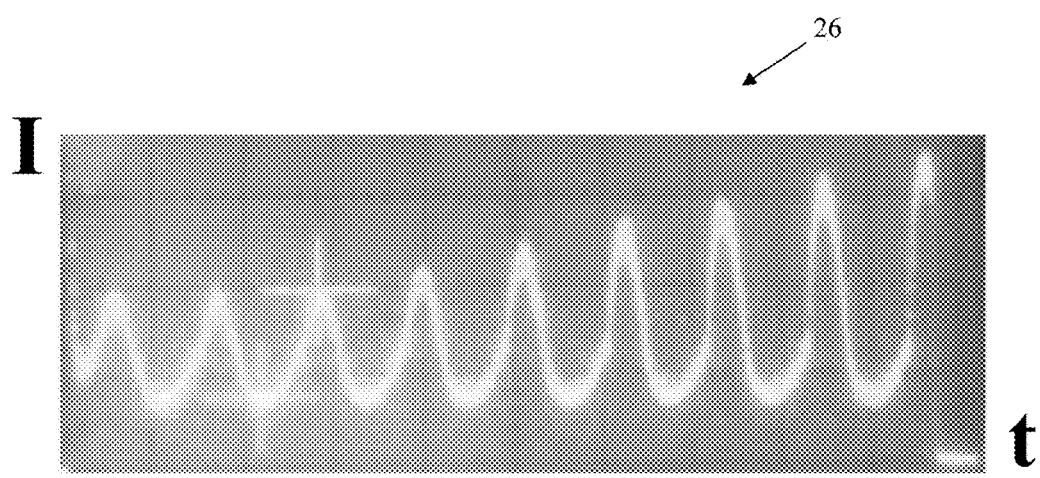
FIG. 2 shows the current supplied to a motor of a lubrication system of a lubrication system according to an embodiment of the present invention.

FIG. 2 shows a typical motor current signal 26 obtained when the motor 12 of a lubrication system 10 according to an embodiment of the invention is running. The variable load on the reciprocating element of the positive displacement pump 14, such as the piston of a piston pump, causes a cyclic current. When the reciprocating element is at the bottom of its chamber the current reaches is minimum value. When the reciprocating element is at the top of its chamber the current reaches is maximum value. The maximum current measured may increase with time, as shown in FIG. 2, if the output pressure of the positive displacement pump 14 increases with time.

The minimum current (idle current) indicates friction in motor gear and the movement of a follower plate in a lubricant container. Its magnitude may be dependent on the temperature or the type of lubricant used in the lubrication system 10.

The peak to peak current of a cycle (Peak-Idle (P/I) current) represents the force needed to move the reciprocating element of the positive displacement pump 14. A piston spring force may cause an offset in the current. The current signal may be measured for P/I conversion at a 0 bar level, when lubricant is pumped freely (0 bar current). The peak to peak current may be used for calculating the output pressure.

According to an embodiment of the present invention, a control unit 22 is arranged to convert a motor current signal 26 to pulses 28, by thresholding the motor current signal 26 for example, and to count the number of the discharge strokes of the positive displacement pump 14 by counting the pulses 28.

For determining the motor current to output pressure relationship, the motor current is measured using various pump stop pressures. By counting the current pulses 28, the output volume of the positive displacement pump 14 can be measured, and the lubrication can thereby be controlled.

Figure 3:
FIGS. 3 & 4 show motor current signals obtained from lubrication systems according to embodiments of the present invention.

FIG. 3 shows a motor current signal 26 from a lubrication system 10 and the pulses 28 obtained therefrom. The lubrication is controlled using output pressure. Pressurizing of lubricant, i.e. pumping stops when the motor current 24 reaches a predetermined set stop level, such as a pre-programmed pressure limit, such as a pre-programmed peak to peak current or a current that corresponds to an output pressure of 150 bar for example.

Such a motor current signal 26 may for example be obtained from a single-line lubrication system 10 designed for oil, semi-fluid grease or hard grease NLGI grades 000 to 2. Lubricant volumes ranging from 0.01 to 2.5 cc are dispensed to each lubrication point 20 during each discharge stroke. A piston metering valve per lubrication point may be used to ensure that the right amount of lubricant is delivered, regardless of any changes in viscosity or back pressure. Such a lubrication system 10 may be designed for output pressures ranging from 16 to 315 bars and venting pressures from 2 to 70 bars.

Figure 4:

FIG. 4 shows a motor current signal 26 from a lubrication system 10 and the pulses 28 obtained therefrom. Pressurizing, or pumping, of lubricant stops when a predetermined number of discharge strokes has been reached, i.e. when a pre-programmed pulse count is reached, such as ten discharge strokes in the illustrated example.

Such a motor current signal 26 may for example be obtained from a progressive lubrication system 10 designed for oil, semi-fluid grease or hard grease NLGI grades 000 to 2. A positive displacement pump 14 or flow limiter may be used to supply lubricant through a main line to a distributor that serves each lubricant outlet 18 progressively, with a defined amount of lubricant. To control the lubrication system's function, only one metering reciprocating element has to be controlled. Such progressive lubrication systems may be designed to lubricate up to 150 lubrication points with grease or oil. In combination with parallel flow limiters, they can serve up to 1000 lubrication points or more with oil. Flow rates of 0.01 to 6.000 cm$^3$/minute and output pressures as high as 300 bar are possible.

Figure 5:
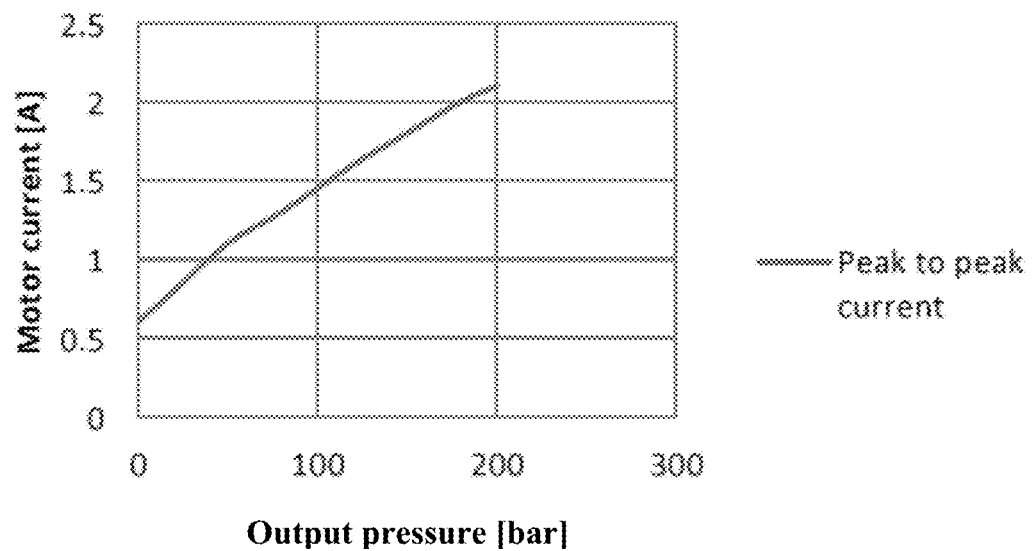
FIG. 5 is a graph of motor current versus output pressure of a positive displacement pump according to an embodiment of the present invention.

FIG. 5 shows a graph of motor current 24 versus output pressure of a positive displacement pump 14 according to an embodiment of the present invention. According to an embodiment of the invention a control unit 22 may be arranged to determine the output pressure of the positive displacement pump 14 from the motor current signal 26. If the magnitude of the motor current is measured or obtained by the control unit 22 (using a sensor for example), the output pressure of the positive displacement pump 14 and consequently the amount of lubricant discharged during each discharge stroke of the positive displacement pump 14 can be determined. By controlling the current 24 supplied to a motor 12, the amount of lubricant dispensed by the lubrication system 10 can thereby be controlled.

The present invention concerns a method for determining the amount of lubricant that is dispensed from a lubrication system 10 such as the lubrication system illustrated in FIG. 1. The lubrication system 10 comprises a motor 12, a positive displacement pump 14 driven by the motor 12, a lubricant container 16 in fluid communication with the positive displacement pump 14, at least one lubricant outlet 18 in fluid communication with the lubricant container 16, whereby the positive displacement pump 14 is arranged to carry out at least one discharge stroke to dispense lubricant from the at least one lubricant outlet 18 when the lubrication system 10 is in use. In the method, a control unit 22 determines an amount of lubricant that is dispensed from the lubricant container 16 via the at least one lubricant outlet 18 when the lubrication system 10 is in use by monitoring current supplied to the motor 12 so as to obtain a motor current signal 26, and determining the number of the discharge strokes from the motor current signal 26.

According to an embodiment of the invention the method comprises the steps of converting the motor current signal 26 to pulses 28 and counting the number of the discharge strokes by counting the pulses 28.

According to an embodiment of the invention the method comprises the step of determining the output pressure of the positive displacement pump 14 from the motor current signal 26.

Figure 6:
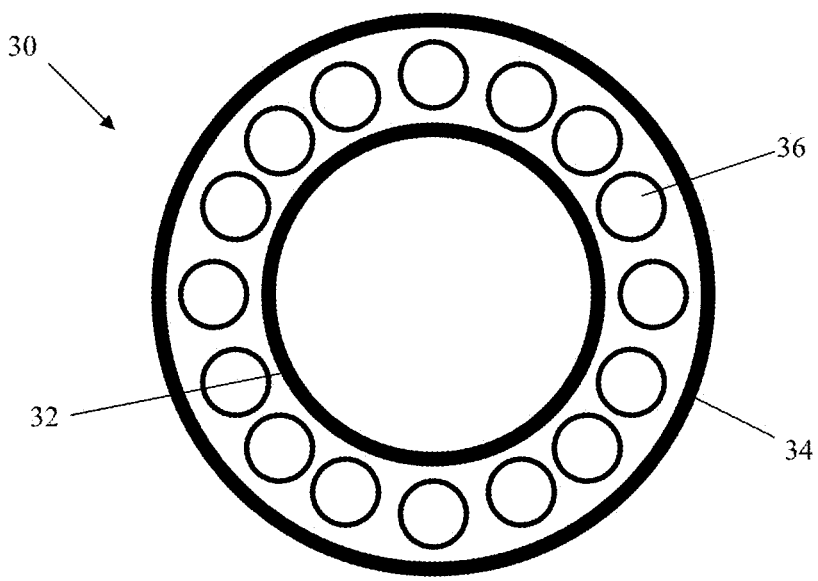
FIG. 6 shows a machine component that can be lubricated using a lubrication system or method according to the present invention.

FIG. 6 shows an example of a component that can be lubricated using a lubrication system 10 or method according to the present invention. FIG. 6 shows a bearing 30, namely a rolling element bearing 16 that may range in size from 10 mm diameter to a few meters diameter and have a load-carrying capacity from a few tens of grams to many thousands of tonnes. The bearing 30 according to the present invention may namely be of any size and have any load-carrying capacity. The illustrated bearing 30 comprises an inner ring 32 and an outer ring 34 and a set of rolling elements 36.

At least one point on a surface of the inner ring 32, the outer ring 34 and/or the rolling elements 36 of the rolling element bearing 30, and preferably a plurality of points on the surface of the component parts of the bearing 30 are lubricated using a lubrication system 10 or method according to the present invention.

Further modifications of the invention within the scope of the claims would be apparent to a skilled person. For example, even though the claims are directed to a lubrication system and method for dispensing lubricant, the present invention may be used in any motorized fluid dispensing system in which any liquid, such as soap, cleaning fluid, paint, insecticide etc. is to be dispensed.

What is claimed is:

1. A lubrication system comprising:
   a motor;
   a positive displacement pump driven by the motor;
   a lubricant container in fluid communication with the positive displacement pump;
   at least one lubricant outlet in fluid communication with the lubricant container, wherein the positive displacement pump is arranged to carry out at least one discharge stroke to dispense lubricant from the at least one lubricant outlet when the lubrication system is in use, and
   a control unit arranged to determine an amount of lubricant that is dispensed from the lubricant container via the at least one lubricant outlet when the lubrication system is in use,
   wherein the control unit is arranged to monitor current supplied to the motor to obtain a motor current signal, wherein the control unit utilizes the motor current signal to determine the number of the discharge strokes using the obtained motor current signal.

2. The lubrication system according to claim 1, wherein the control unit is arranged to convert the motor current signal to pulses and count the number of the discharge strokes by counting the pulses.

3. The lubrication system according to claim 1, wherein the control unit is arranged to determine the output pressure of the positive displacement pump from the motor current signal.

4. A method for determining the amount of lubricant that is dispensed from a lubrication system comprising:
   a motor,
   a positive displacement pump driven by the motor,
   a lubricant container in fluid communication with the positive displacement pump,
   at least one lubricant outlet in fluid communication with the lubricant container, whereby the positive displacement pump is arranged to carry out at least one discharge stroke to dispense lubricant from the at least one lubricant outlet when the lubrication system is in use, and
   a control unit arranged to determine an amount of lubricant that is dispensed from the lubricant container via the at least one lubricant outlet when the lubrication system is in use,
   the method comprising steps of:
   monitoring current supplied to the motor so as to obtain a motor current signal; and
   determining the number of the discharge strokes using the obtained motor current signal.

5. The method according to claim 4, further comprising steps of:
   converting the motor current signal to pulses; and
   counting the number of the discharge strokes by counting the pulses.

6. The method according to claim 4, further comprising a step of:
   determining the output pressure of the positive displacement pump from the motor current signal.

7. A computer program product, comprising a computer program containing computer program code for determining the amount of lubricant that is dispensed from a lubrication system comprising:
   a motor,
   a positive displacement pump driven by the motor,
   a lubricant container in fluid communication with the positive displacement pump,
   at least one lubricant outlet in fluid communication with the lubricant container, whereby the positive displacement pump is arranged to carry out at least one discharge stroke to dispense lubricant from the at least one lubricant outlet when the lubrication system is in use, and
   a control unit arranged to determine an amount of lubricant that is dispensed from the lubricant container via the at least one lubricant outlet when the lubrication system is in use, the computer program code arranged to cause one of a computer or a processor to execute steps of:
   monitoring current supplied to the motor so as to obtain a motor current signal;
   determining the number of the discharge strokes using the obtained motor current signal; and
   storing the computer program on one of a computer-readable medium or a carrier wave.

8. The computer program product according to claim 7, the computer program code arranged to cause the one of the computer or the processor to execute additional steps of:
   converting the motor current signal to pulses; and
   counting the number of the discharge strokes by counting the pulses.

9. The computer program product according to claim 7, the computer program code arranged to cause the one of the computer or the processor to execute an additional step of:

determining the output pressure of the positive displacement pump from the motor current signal.

* * * * *